United States Patent [19]

Parks et al.

[11] Patent Number: 4,484,461
[45] Date of Patent: Nov. 27, 1984

[54] DYE MACHINE WITH CAPACITY DECREASING INSERT

[75] Inventors: Gary P. Parks; Jack H. Wade, both of Morganton, N.C.

[73] Assignee: Hosiery Manufacturing Corp. of Morganton, Morganton, N.C.

[21] Appl. No.: 554,000

[22] Filed: Nov. 21, 1983

[51] Int. Cl.³ .............................................. D06F 5/26
[52] U.S. Cl. ..................................................... 68/142
[58] Field of Search ................. 68/139, 142, 143, 144, 68/145, 212, 235 R; 134/120, 157; 69/30

[56] References Cited

U.S. PATENT DOCUMENTS

| | | | |
|---|---|---|---|
| 2,191,891 | 2/1940 | Levitetz | 68/143 X |
| 2,274,121 | 2/1942 | Bendix | 68/140 X |
| 2,530,822 | 11/1950 | Kamn | 68/142 X |

FOREIGN PATENT DOCUMENTS

| | | | |
|---|---|---|---|
| 412332 | 4/1925 | Fed. Rep. of Germany | 68/143 |
| 1207328 | 12/1965 | Fed. Rep. of Germany | 68/143 |

*Primary Examiner*—Philip R. Coe
*Attorney, Agent, or Firm*—Bell, Seltzer, Park & Gibson

[57] ABSTRACT

The generally pie-shaped capacity decreasing insert plates are designed and shaped for easy insertion into and removable through the access door to the rotating cylinder. When positioned in the rotating cylinder, the capacity decreasing insert plates reduce the normal volume of the rotating cylinder so that a reduced quantity of textile articles may be dyed with a corresponding reduced amount of dye liquid in the dye machine. The capacity decreasing insert plates thus permit the selective variation of the volume of the rotating cylinder between a full capacity and a reduced capacity.

5 Claims, 5 Drawing Figures

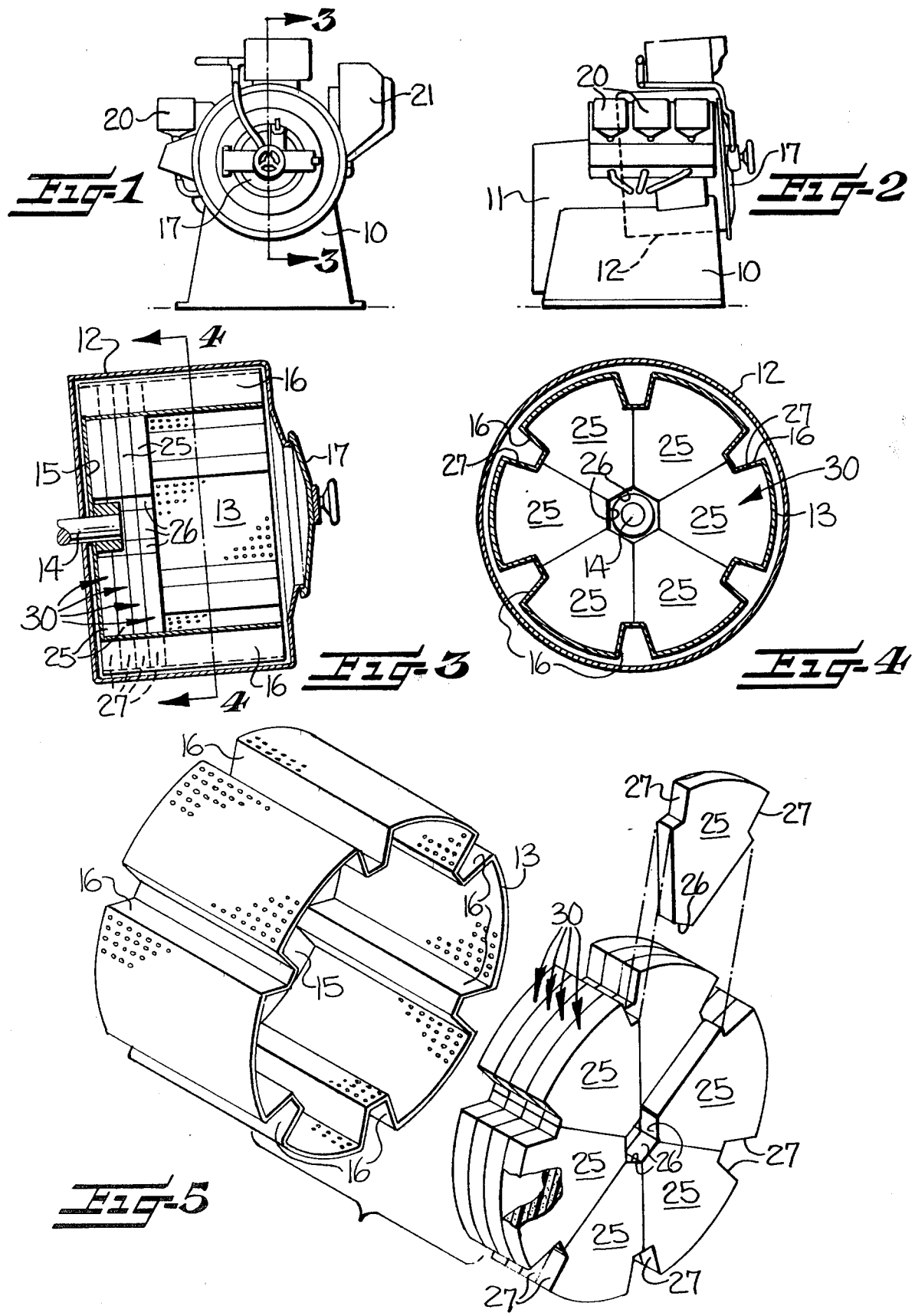

DYE MACHINE WITH CAPACITY DECREASING INSERT

FIELD OF THE INVENTION

This invention relates generally to a machine for treating a predetermined quantity of textile articles with liquid, such as dye, and more particularly to such a machine with capacity decreasing insert means, which is easily inserted and removed to vary the volume or capacity so that the machine may be utilized in processing full capacity and reduced capacity loads of textile articles in the same machine.

BACKGROUND OF THE INVENTION

Machines for treating textile articles with liquids, such as washing, scouring and dyeing machines are usually designed and manufactured to process a particular quantity or number of pounds of textile articles. When it is desired to process less than a "full load" some adjustment in the amount of water, chemicals, or treating liquid must be made. This adjustment is usually made in home-type laundry or washing machines by reducing the amount of water and soap supplied with a "partial load."

While varying the amount of water and detergent successfully cleans partial loads in home-type washing machines, such partial loads are not subjected to the same type of washing action as are full loads. Such deficiencies in treating action may be tolerated for home laundry, but are not permitted in more precise liquid treating operations, such as dyeing of textile articles. In such more precise liquid treating operations, it is necessary to very accurately control various operating parameters, such as temperature, liquid concentrations, liquid contact with the textile articles, dwell time of the textile articles in the treatment liquid, and agitation of the textile articles in the treatment liquid, if the same results are to be achieved with varying quantities of textile articles being treated in the same machine.

Attempts to reduce the effects of variances in washing action with varying loads are disclosed in U.S. Pat. Nos. 2,274,121 and 2,530,822. These patents disclose textile washing machines with a cylindrical perforated rotor or washing cylinder provided with a baffle plate mounted therein for movement between the ends of the washing cylinder so as to vary the volume or capacity of the portion of the washing cylinder which contains the textile articles when washing varying quantities of textile articles therein. While the baffles disclosed in these patents do change the volume of the article-containing portion of the washing cylinder, these baffles do not change the volume or space occupied by the liquid in the washing machine when processing reduced loads of textile articles.

SUMMARY OF THE INVENTION

With the foregoing in mind, it is an object of the present invention to provide a dye machine or the like with capacity decreasing insert means which may be easily placed in the rotating cylinder for reducing the normal volume thereof so that a reduced quantity of textile articles may be processed with a corresponding reduced amount of liquid in the machine, as well as a reduced amount of chemical dyestuff being required to achieve the same dye shade results as would be obtained with a full capacity load.

In accordance with the present invention, the capacity decreasing insert means includes a plurality of generally pie-shaped plates or segments of a circle which may be individually inserted into the rotating cylinder through the access door. The segments are arranged in side-by-side relationship to form at least one annular space-occupying element positioned against the inner wall of the cylinder so as to selectively reduce the volume of the cylinder from a full capacity to a reduced capacity. The capacity decreasing insert means is illustrated as being formed of segments of foam material and the outer peripheral portions of each of the segments are notched to cooperate with longitudinally extending ribs on the inner surface of the cylinder so that the segments are maintained in position while the cylinder is rotated.

The segments may be inserted in layers to provide any desired number of annular space-occupying elements starting with the inner closed end portion of the cylinder and extending forwardly toward the access opening or door. The number of annular space-occupying elements may be varied so as to selectively vary the volume of the cylinder. The annular space-occupying elements reduce the space the textile articles occupy in the cylinder and also reduce the space the liquid occupies in the cylinder. Thus, the annular space-occupying elements reduce the volume of the cylinder for reception of textile articles as well as for reception of liquid dyestuff and the like. Each of the segments preferably occupies one sixth of the diameter of the cylinder and six insert segments are inserted in the cylinder to form one annular space-occupying element.

BRIEF DESCRIPTION OF THE DRAWINGS

Other objects and advantages will appear as the description proceeds when taken in connection with the accompanying drawings, in which—

FIG. 1 is a front elevational view of a conventional dye machine;

FIG. 2 is a left-hand side elevational view of the dye machine shown in FIG. 1;

FIG. 3 is an enlarged fragmentary vertical sectional view illustrating the rotating cylinder with a plurality of the present annular space-occupying elements inserted therein to reduce the capacity thereof;

FIG. 4 is a vertical sectional view taken substantially along the line 4—4 in FIG. 3; and FIG. 5 is an exploded isometric view showing the rotating perforated cylinder and the manner in which the segments making up the annular space-occupying elements are arranged in the inner end of the cylinder.

DESCRIPTION OF THE ILLUSTRATED EMBODIMENT

The dye machine illustrated is of the type manufactured by Pellerin Milnor Corporation and known as their Model 4226. This dye machine is provided with automatic controls for applying the proper amount of water, as well as the proper amounts of dye chemicals for dyeing textile products to the desired shade, along with automatic controls for heating the water with steam, and pumps for directing water into and out of the rotating perforated cylinder containing the textile articles. However, it is to be understood that the present invention may be utilized with other types of dye machines or textile processing machines.

The dye machine includes a base 10 with a housing 11 containing the usual drive motor and pumps, not shown, for controlling the operation of the machine. The housing 11 includes a liquid-containing chamber 12 (FIGS. 3 and 4) surrounding and enclosing the usual rotatable tub in the form of a perforated cylinder 13. The cylinder 13 is supported for rotation in a position slightly inclined from the horizontal and is rotated by a drive shaft 14 (FIG. 3) fixed at one end to the inner wall 15 of the cylinder 13. Longitudinally extending and spaced-apart ribs 16 are provided around the periphery of the cylinder 13.

An access door 17 is hingedly supported on the front face of the housing 12 to provide access to the inner portion of the rotating cylinder 13 for inserting and removing textile articles to be dyed. The machine may also include liquid containers 20, 21 supported on opposite sides of the housing 11 for containing liquid dyestuffs, lubricants, bleaches and the like for automatic dispensing of the same into the rotating cylinder 13 and liquid-containing chamber 12. The machine illustrated is designed to dye a particular quantity of textile articles and in the present instance, the machine is designed to dye 100 pounds of textile articles, referred to as a "full capacity" load. Various dye calculations are formulated for producing a particular shade of textile article when a full capacity load is inserted in the rotating cylinder 13. The proper amount of dye chemical, water, and steam is supplied to the cylinder 13 and the cylinder is rotated the required length of time to produce the desired shade of color in the textile articles. However, in certain instances, it is desirable to dye less than the full capacity load, such as when producing a sample lot of textile articles in small quantities.

In accordance with the present invention, the desired shade of color can be obtained when dyeing a less than full capacity load by blocking off a portion of the normal space in the rotating cylinder 13 by selectively inserting capacity or volume decreasing insert means into the rotating cylinder. The capacity decreasing insert means of the present invention is illustrated as including a plurality of generally pie-shaped foam plates or segments 25. Any number of different types of foam material may be utilized in forming the segments 25. The foam material of which the capacity decreasing insert segments 25 is formed may be one of many suitable types which is resistant to heat as high as 200 degrees F., is resistant to both acid and disperse dyes as well as acid and alkaline conditions. It is preferred that the foam material be impervious, so that the liquid textile dye solution will not penetrate the capacity decreasing insert segments 25. The segments 25 may be molded or may be cut from sheets of foam material to the desired shape to fit inside of and be retained in position in the cylinder 13.

The inner ends of the segments 25 are provided with flat inner end portions 26 and opposite side edges diverge outwardly therefrom with the outer peripheral surface of each segment 25 being curved to correspond with the curvature of the inner surface of the rotating cylinder 13. Opposite sides of the outer portion of the segment 25 are notched, as indicated at 27 in FIG. 5, to snugly fit against the portion of the inner surface of the rib 16 and along the edge thereof when the segments 25 are positioned in the rotating cylinder 13, as illustrated in FIG. 4.

The size and shape of the segments 25 is sufficient that they may be easily inserted and removed through the access door 17. When it is desired to reduce the capacity of the rotating cylinder 13, one or more rows or layers of the segments 25 is inserted in the inner end of the rotating cylinder 13 to form successive annular space-occupying elements, broadly indicated at 30. Thus, any desired portion or percentage of volume of the rotating cylinder 13 may be blocked off to exclude textile articles and liquid therefrom. As illustrated in FIGS. 3 and 5, the segments 25 are inserted in the inner end of the rotating cylinder 13 to form four annular space-occupying elements 30 thereby excluding or blocking off approximately one-third of the normal full capacity of the rotating cylinder 13. If it is desired to block off or decrease the normal full-load capacity of the rotating cylinder by one fourth, three rows or layers of annular space-occupying elements 30 formed of segments 25 may be inserted in the inner end of the rotating cylinder 13.

While six generally pie-shaped segments 25 are illustrated as being positioned in abutting relationship to form each annular space-occupying element 30, it is to be understood that the segments 25 could be larger or smaller than that illustrated so that a greater or lesser number of segments would be required to form a complete annular space-occupying element 30 in the rotating cylinder 13. The segments 25 are shaped to closely fit together when positioned in the rotating cylinder 13, as illustrated in FIG. 4, so that they remain in position in the rotating cylinder 13 as the same is rotated for processing the textile articles. The segments 25 are resiliently held in position when they are wedged into the inner end of the rotating cylinder 13.

When the capacity decreasing insert segments 25 are positioned in the rotating cylinder 13, they reduce the normal volume of the rotating cylinder so that a reduced quantity of textile articles may be processed with a corresponding reduced amount of liquid and still produce the same shade of color in the textile articles. The amount of dye chemicals and liquids supplied to the rotating cylinder 13 is reduced by the same percentage as the percentage of decrease in the volume of the cylinder 13. This reduced amount of liquid also reduces the steam usage because a lesser volume of liquid has to be heated.

As a specific but nonlimiting example, the 100-pound dye machine illustrated has a rotating cylinder 13 which is 42 inches in diameter and is 26 inches deep and a full capacity load of textile articles normally requires approximately 100 gallons of water. The segments 25 are approximately 2 inches thick so that four annular space-occupying elements 30 occupy approximately one third of the space of the cylinder 13. With the segments 25 in position, only 66 gallons of water is required to dye a textile load reduced by one third, or approximately 66 pounds, thus resulting in a savings of one third of the cost of the liquid. The reduction in the amount of water used also results in a savings of approximately one third of the amount of dye chemicals normally used in dyeing a full-capacity load of textile articles to a particular shade or color. Corresponding reductions in the amount of steam usage to heat the liquid is also achieved by using the capacity decreasing segments of the present invention.

Corresponding reductions in water, dye and steam are achieved when three annular space-occupying elements 30 of capacity decreasing insert segments 25 are inserted in the rotating cylinder 13. In this case, the normal capacity of the rotating cylinder 13 is reduced by approximately one fourth the normal volume. Obviously, a greater or lesser number of annular space-occupying elements 30 may be formed by inserting the segments 25 in the rotating cylinder 13 to correspondingly vary the normal volume of the rotatable cylinder.

In the drawings and specification, there has been set forth the best mode presently contemplated for the practice of the present invention, and although specific terms are employed, they are used in a generic and descriptive sense only and not for the purpose of limitation, the scope of the invention being defined in the claims.

That which is claimed is:

1. In a machine for treating textile articles with liquid, such as dye, and including a housing, a rotatable cylinder supported for rotation about a substantially horizontal axis in said housing and having space therein for confining textile articles for treatment by the liquid, said cylinder including a closed inner wall and an open outer end, and an access door supported on said housing and communicating with said open outer end of said cylinder for placing textile articles into and removing the same from said cylinder, the combination therewith of capacity decreasing insert means for reducing the volume of the space within said rotatable cylinders so that a reduced quantity of textile articles may be treated with a correspondingly reduced amount of liquid in said machine, said capacity-decreasing insert means comprising a plurality of segments which may be individually inserted into said cylinder and arranged to form at least one annular space-occupying element against said closed inner wall of said cylinder, said segments being adapted to be positioned in said cylinder and removed therefrom through said access door so as to selectively vary the capacity of said cylinder.

2. In a machine according to claim 1 wherein said segments are formed of foam material.

3. In a machine according to claim 2 wherein said segments are arranged in side-by-side relationship to form a plurality of successive annular space-occupying elements extending inwardly of said cylinder from said closed inner wall.

4. In a machine according to claim 2 wherein said cylinder includes spaced-apart ribs extending longitudinally along the inner surface thereof, and wherein each of said segments of foam material spans the space between adjacent ribs.

5. In a machine according to claim 4 wherein opposite sides of the outer portions of each of said segments are notched to fit around said ribs of said cylinder.

* * * * *